- WITH HEEL CRACK
- ○ WITHOUT HEEL CRACK $$C_{eq} = C + \tfrac{1}{24}Si + \tfrac{1}{6}Mn + \tfrac{1}{5}Cr + \tfrac{1}{4}Mo + \tfrac{1}{40}Ni + \tfrac{1}{14}V$$

United States Patent Office 3,795,508
Patented Mar. 5, 1974

---

3,795,508
STEEL CONTAINING ALUMINUM, COPPER AND NICKEL
Jinkichi Tanaka and Junichi Tanaka, Kawasaki, and Tatsumi Osuka, Fukuyama, Japan, assignors to Nippon Kokan Kabushiki Kaisha, Kanagawa-ken, Japan
Filed Sept. 3, 1971, Ser. No. 177,611
Claims priority, application Japan, Sept. 9, 1970, 45/73,418
Int. Cl. B21b 31/08; B60b 7/04
U.S. Cl. 75—124                               3 Claims

ABSTRACT OF THE DISCLOSURE

A steel composition for steel stocks for use in welding and construction and which have a tensile strength of about 45 to 55 kg./mm.$^2$, said steel composition including a phosphorus content relative to the carbon equivalent Ceq selected to impart the property of resistance to heel cracking in fillet welding.

BACKGROUND OF INVENTION

Steel stocks having a tensile strength of about 45 to 55 kg./mm.$^2$ are widely used for welding and construction. Even though the stocks are standardized in quality, various problems can arise in welding operations, more particularly so-called heel cracking in fillet welding and it has been strongly desired to overcome this particular problem in fillet welding for some time.

Heel cracks are a kind of a hydrogen-crack, and therefore are apt to occur more often when the length of welding is shorter. For example, a crack may form at the root of a steel plate located on the flange side of a T-joint and advance along the bond in the heat affecting zone of base metal (not in the welded metal) to cause an opening in the heat affecting side zone. Such a crack at low temperature is usually referred to as "heel crack."

The problem of this heel crack has been invetigated. Conventionally, however, the preventive measures for avoiding cracking have been concentrated on the adjustments in welding conditions, welding processes and the like; and very little has been done to make a basic metallurgical study of the steel itself as the raw material. The industry has therefore had difficulty in understanding the cause which brings about different weldability in respect of heel cracks in seemingly quite similar compositions of steel.

OBJECT OF THE INVENTION

With the foregoing as the background, the present invention proposes a basic improvement in the steel composition so that heel cracking will not occur when fillet welding steel components of about 45 to 55 kg./mm.$^2$ strength for use in welding and construction.

SUMMARY OF THE INVENTION

The present invention provides a basic improvement in steel composition for steel components for use in construction and welding, by regulating the carbon equivalent and phosphorous contents thereof in order to prevent the heel cracks which are formed in the conventional steels at the time of fillet welding. Moreover, it provides a high tensile strength steel (primarily of 45 to 55 kg./mm.$^2$) of superior yield point and tensile strength.

DESCRIPTION OF PREFERRED EMBODIMENTS

The present invention provides a high tensile strength steel of about 45 to 55 kg./mm.$^2$ wherein heel cracking at a fillet welded part is substantially avoided. More particularly, in a first aspect, the steel in accordance with the invention contains such amount of phosphorus as to satisfy the relationship that P (percent)—0.375 Ceq+0.1575 (where Ceq is defined by the equation:

Ceq=C percent+$\frac{1}{24}$S: percent+$\frac{1}{6}$Mn percent
 +$\frac{1}{5}$Cr percent+$\frac{1}{4}$Mo percent
  +$\frac{1}{40}$Ni percent+$\frac{1}{14}$V percent)

Steel having a composition within said range has a property to prevent formation of heel cracks in fillet welding under the ambient temperature. Moreover, it essentially has a yield point of more than 27 kg./mm.$^2$ and a tensile strength of more than 45 kg./mm.$^2$. The possible range of each component in the steel has been determined in accordance with the above relationship on the basis of the following.

To find out the metallurgical factors which influence the tendency to heel cracking at the fillet welded part, a non restrictive T-shape fillet welding test developed was conducted for some hundreds of steel stocks.

This test was specially developed by the applicant and uses far more severe conditions than the conditions in actual welding operations. The steel stocks that did not show cracks under this test have been ascertained to show no cracks in the actual fillet welding with short welding length.

Figure 1:
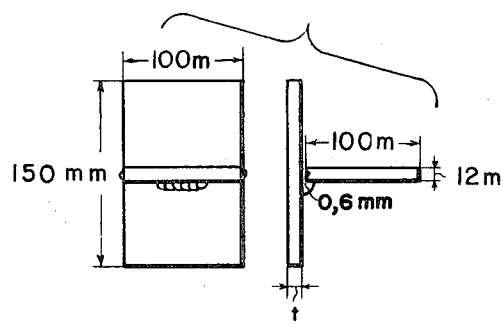
FIG. 1 is an explanatory view illustrating the dimensions of a test piece in a non-restrictive T-shaped fillet welding test.

The configuration of the test piece was as shown in FIG. 1. Table 1 indicates the welding conditions.

TABLE 1

Conditions for welding

| | |
|---|---|
| Welding bar | LMB 52, 4 mm. $\phi$. |
| Leg length | 5 mm. bead length: 40 mm. |
| Ampere | 170 A rate of welding: 200 mm./min. |
| Voltage | 25–30 v. |
| Humidity | 40–70%. |
| Temperature | Ambient temperature (lower than 25° C.). |
| Preheating | None. |

Figure 2:
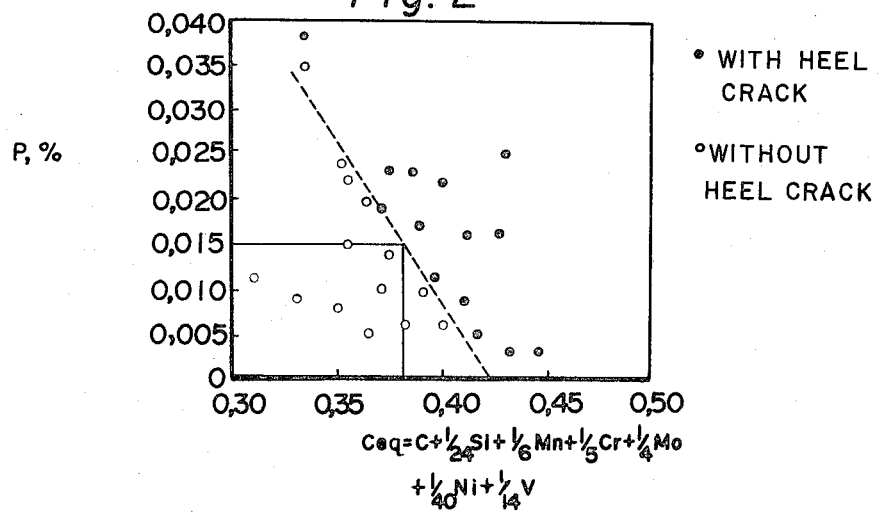
FIG. 2 is a graph showing carbon equivalent Ceq (as hereinafter defined) and P percent obtained from the results of a heel crack test on various steel stocks.

As a result, data on the steel compositions having a tensile strength of about 45 to 55 kg./mm.$^2$ were obtained, as shown in FIG. 2.

The results of the test indicate that it is necessary to reduce the amount of the carbon equivalent and phosphorus content in order to avoid heel cracking in fillet welding at the ambient temperature, and then when one of said contents is high, the other must be kept at a very low value. The range of components which permits prevention of heel cracking is, when expressed in numerical terms, P (percent)<—0.375 Ceq+0.1575. Further, it has been found preferred to control the amounts of P and the carbon equivalent to be P≤0.015%, Ceq<0.38% and preferably Ceq≤0.36%, so that no cracks occur in fillet welding at the ambient temperature.

It is a remarkable discovery that phosphorus content is responsible for heel cracking, and it is this discovery that lies at the basis of the present invention. The range of the carbon equivalent and phosphorus content is thus determined.

In a second aspect, in the steel in accordance with the invention, the carbon equivalent and phosphorus content preferably satisfy the relationship, $$P\ (\text{percent}) < -0.375\ Ceq + 0.1575$$

when the carbon content is $C \leq 0.15\%$. (Ceq again being equal to C percent$+\frac{1}{24}$SI percent$+\frac{1}{6}$Mn percent$+\frac{1}{5}$Cr percent$+\frac{1}{4}$Mo percent$+\frac{1}{40}$Ni percent$+\frac{1}{14}$V percent). This steel may further contain silicon 0.10% to 0.55%, Mn 0.80 to 1.50%, sulfur 0.020% or less, acid soluble Al 0.010 to 0.11%, and again has the property that heel cracking does not occur in fillet welding at the ambient temperature. Moreover, it maintains the level of yield point of more than 27 kg./mm.$^2$ and the tensile strength of more than 45 kg./mm.$^2$. The range of each component in this steel is determined in accordance with these further relationships on the basis of the following.

The range of the carbon equivalent and phosphorus content is determined for the same reasons as previously given. In addition, the carbon content is given the stated upper limit in order to assure that the restriction imparted by the carbon equivalent is effective. The minimum required amount of Mn to maintain the steel strength defines the lower limit thereof, while the upper limit is determined with due consideration to cracks resulting from butt welding. Silicon is an essential component in the steel as a deoxidizing agent; its lower limit represents the minimum amount required to obtain a killed steel in a stable manner, and the upper limit is the maximum which does not affect the toughness. Sulfur is harmful to almost all of the steel properties except machinability and it is most undesirable that its content should exceed the upper limit. Acid soluble Al fixes nitrogen present in the steel whereby the grains will be refined to improve mechanical properties of the steel. It is necessary to add Al in more than the amount of its lower limit in order to assure its effectiveness. However, it is also required to keep below the upper limit since heel cracks are more likely to occur when the Al content exceeds the upper limit.

However, such control of the components with a view to prevent cracking will tend to result in deterioration in steel strength. This becomes more pronounced when the plate thickness increases, and special consideration is necessary.

In such a case, the strength of the steel can be maintained by adding elements, e.g. Cu, Ni, Nb, V, etc.; that have less influences on the cracking tendency. For example, in order to obtain a yield point $\geq 32$ kg./mm.$^2$ and a tensile strength $\geq 50$ kg./mm.$^2$, either Cu in the range of 0.1 to 0.5% or Ni in the range of 0.1 to 0.4% or both of said elements may be added to the steel.

Table 2 shows the properties of various steels as above described in accordance with the present invention. As is apparent from the table, no cracking was observed in the steel of the invention, whereas comparison steels whose compositions are seemingly quite the same, cracked.

Thus, the steel of the present invention having the composition in the above defined range will not heel crack at the fillet welded part when it is welded at the ambient temperature without preheating. Moreover, it maintains the strength level of yield point $\geq 27$ kg./mm.$^2$ and tensile strength $\geq 45$ kg./mm.$^2$. When either Cu in the range of 0.1 to 0.5% or Ni in the range of 0.1 to 0.4%, or both of said two elements are added, the steel stocks have improved strength of yield point $\geq 32$ kg./mm.$^2$ and improved tensile strength $\geq 50$ kg./mm.$^2$.

In the steel of the present invention, in a third aspect, the carbon equivalent (Ceq=C percent$+\frac{1}{24}$Si percent$+\frac{1}{6}$Mn percent$+\frac{1}{5}$Cr percent$+\frac{1}{4}$Mo percent$+\frac{1}{40}$Ni percent$+\frac{1}{14}$V percent)

and the phosphorus content satisfy the relationship, $P\ (\text{percent}) < -0.375\ Ceq + 0.1575$, preferably when $$C \leq 0.15\%,$$

and further, the steel preferably contains Si 0.1 to 0.55%, Mn 0.8 to 1.50%, S$\leq$0.020% and acid soluble Al 0.010 to 0.11%. By adding either Nb 0.01 to 0.05% or V 0.01 to 0.10%, or both of said two elements to the steel having the above mentioned range of composition, the steel will again be imparted with improved heel crack resisting properties when fillet welding at the ambient temperature without preheating. Moreover, this steel maintains a yield point $\geq 32$ kg./mm.$^2$ and a tensile strength $\geq 50$ kg./mm.$^2$.

Phosphor, the carbon equivalent, C, Si, Mn, S and acid soluble Al are each limited to the above ranges for the same reasons as given in relation to the second aspect. V and Nb in the above range have little influence on heel cracking and it is necessary to add more than the lower limit in order effectively to increase the strength of the steel.

When the plate thickness is increased or the cooling speed is lowered, the steel may not have as much strength as it should if the composition is controlled mainly for crack prevention. In such a case, particular care should be taken so that components which have less influences on heel cracking and the toughness of the steel may be added to overcome the problem. Thus, a steel having a strength of 50 kg./mm.$^2$ and thicker plate thickness, which will not heel crack in fillet welding at the ambient temperature, may be obtained by adding either Cu 0.1 to 0.5% or Ni 0.1 to 0.4%, or both of two elements to the steel having the above described composition. Since small increase of N addition will have a very little influence on heel cracking, N can be added as much as 0.012%, if necessary, to produce a grain refined steel.

The properties of the steel in accordance with the third aspect of the present invention are given in Table 3. As is apparent from the table, whereas the steel in accordance with the present invention does not crack, other steels whose contents are seemingly the same do.

TABLE 2.—EXAMPLE

| | C | Si | Mn | P | S | Sol Al | Others | Ceq | Heel crack* | Y.P., kg./mm.$^2$ | T.S., kg./mm.$^2$ | VEo, kg./m. | Plate thickness, mm. |
|---|---|---|---|---|---|---|---|---|---|---|---|---|---|
| Steels of the invention | 0.11 | 0.36 | 1.22 | 0.009 | 0.018 | 0.041 | | 0.328 | None | 29.3 | 46.1 | 11.8 | 25 |
| | 0.14 | 0.48 | 1.29 | 0.015 | 0.011 | 0.032 | | 0.375 | do | 30.4 | 51.1 | 18.2 | 20 |
| | 0.13 | 0.40 | 1.30 | 0.010 | 0.010 | 0.040 | Cu 0.32 / Ni 0.13 | 0.365 | do | 34.9 | 51.5 | 13.4 | 25 |
| | 0.11 | 0.32 | 1.35 | 0.010 | 0.010 | 0.036 | Cu 0.33 / Ni 0.11 | 0.352 | do | 37.1 | 52.7 | 12.0 | 19 |
| Comparative steels | 0.13 | 0.49 | 1.35 | 0.025 | 0.005 | 0.039 | | 0.375 | Observed | 31.1 | 50.8 | 20.4 | 20 |
| | 0.17 | 0.45 | 1.38 | 0.012 | 0.008 | 0.037 | | 0.419 | do | 34.5 | 54.2 | 8.3 | 25.4 |
| | 0.12 | 0.51 | 1.36 | 0.018 | 0.013 | 0.054 | Cu 0.55 / Ni 0.31 | 0.376 | do | 40.8 | 55.3 | 10.5 | 20 |

*Conditions of test are the same as in Table 1.

TABLE 3.—EXAMPLE

| | C | Si | Mn | P | S | Sol Al | Others | Ceq | Heel crack* | Y.P., kg./mm.² | T.S., kg./mm.² | VEo, kg./m. | Plate thickness, mm. |
|---|---|---|---|---|---|---|---|---|---|---|---|---|---|
| Steels of the invention | 0.11 | 0.47 | 1.39 | 0.014 | 0.011 | 0.029 | Nb 0.015 | 0.364 | None | 41.1 | 54.7 | 4.8 | 20 |
| | 0.11 | 0.32 | 1.34 | 0.007 | 0.013 | 0.036 | V 0.036 | 0.350 | do | 40.6 | 54.1 | 13.4 | 20 |
| | 0.10 | 0.19 | 1.00 | 0.009 | 0.006 | 0.016 | Cu 0.21, Ni 0.13, V 0.05, Nb 0.01 | 0.282 | do | 38.6 | 52.1 | 12.8 | 25 |
| | 0.13 | 0.41 | 1.49 | 0.003 | 0.013 | 0.046 | V 0.04, Cu 0.13 | 0.400 | do | 37.7 | 53.2 | 5.0 | 20 |
| Comparative steels | 0.16 | 0.23 | 1.05 | 0.017 | 0.020 | 0.031 | Cu 0.24, Ni 0.20, Cr 0.15, Mo 0.08 | 0.400 | Observed | 37.3 | 52.6 | 14.4 | 20 |
| | 0.12 | 0.49 | 1.35 | 0.024 | 0.012 | 0.054 | | 0.365 | do | 33.7 | 50.2 | 5.8 | 20 |

*Test conditions are the same as in Table 1.

Thus, generally steel having a range of composition in accordance with the invention shows no heel cracking when it is treated by fillet welding at the ambient temperature without preheating. It also maintains a yield point ≧32 kg./mm.² and a tensile strength ≧50 kg./mm.². Further, it can be said that the steel in accordance with the invention has superior characteristics as it can be toughened with either Cu 0.1 to 0.5% or Ni 0.1 to 0.4%, or with both to obtain a greater plate thickness; and again, a grain refined steel may be obtained by adding N in an amount up to 0.012%.

We claim:

1. A steel consisting essentially of, in percent by weight:

| | |
|---|---|
| C | ≦0.15 |
| Si | 0.10–0.55 |
| Mn | 0.80–1.50 |
| S | ≦0.020 |
| Al (acid soluble) | 0.010–0.11 |
| P | ≦ −0.375 Ceq+0.1575 |
| N | Up to 0.012 |
| Cu | 0.1–0.5 |
| Ni | 0.1–0.4 |
| V | 0–0.10 |
| Nb | 0–0.05 | wherein Ceq is equal to C percent + $\frac{1}{24}$ Si percent + $\frac{1}{6}$ Mn percent + $\frac{1}{5}$ Cr percent + $\frac{1}{4}$ Mo percent + $\frac{1}{40}$ Ni percent + $\frac{1}{14}$ V percent.

2. A steel according to claim 1 containing 0.01–0.10 of V.

3. A steel according to claim 1 containing 0.01–0.10 of V and 0.01–0.05 of Nb.

References Cited
UNITED STATES PATENTS

| | | | |
|---|---|---|---|
| 2,763,544 | 9/1956 | Wagner | 75—124 |
| 2,901,346 | 8/1959 | Huddle | 75—124 |
| 3,155,495 | 11/1964 | Nakamura | 75—124 |
| 3,249,426 | 5/1966 | Nakamura | 75—124 |
| 3,259,970 | 7/1966 | Morita | 75—124 |

HYLAND BIZOT, Primary Examiner

U.S. Cl. X.R.

75—125

UNITED STATES PATENT OFFICE
CERTIFICATE OF CORRECTION

Patent No. 3,795,508            Dated  March 5, 1974

Inventor(s) Jinkichi Tanaka et al.

It is certified that error appears in the above-identified patent and that said Letters Patent are hereby corrected as shown below:

In the heading to the printed specification, lines 3 and 4, should read -- Jinkichi Tanaka and Junichi Tanaka, Kawasaki, and Tatsumi Osuka, Masaharu Ito and Kiminari Kawakami, Fukuyama, Japan --. Column 1, last line, after "test;" insert -- and --. Column 2, line 14, after "1/24" replace "S:" with -- Si --. Columns 5 and 6, Table 3, last column, last line - reprint "$2_0$" as -- 20 --.

Signed and sealed this 15th day of October 1974.

(SEAL)
Attest:

McCOY M. GIBSON JR.
Attesting Officer

C. MARSHALL DANN
Commissioner of Patents